Patented June 8, 1937

2,082,804

UNITED STATES PATENT OFFICE 2,082,804

PREPARATION OF METALLIC SALTS OF DI-CARBOXYLIC ACID ESTERS OF CELLULOSE

Carl J. Malm and Charles R. Fordyce, Rochester, N. Y., assignors, by mesne assignments, to Eastman Kodak Company, Jersey City, N. J., a corporation of New Jersey No Drawing. Application September 23, 1933, Serial No. 690,763

6 Claims. (Cl. 260—101)

The present invention relates to the preparation of inorganic salts of a dicarboxylic acid ester of cellulose by reacting upon the ester with a weakly basic reagent which has sufficient strength to neutralize the free acid groups but is too weak to remove the acyl groups which are combined with the cellulose.

The alkaline salts of the dicarboxylic acid esters of cellulose have been prepared by treating an ester of that nature with an inorganic water-soluble hydroxide which process is disclosed and claimed by C. J. Malm and C. E. Waring in their application Serial No. 627,149 filed July 30, 1932. Although this process has been found to be satisfactory for the preparation of salts of the dicarboxylic acid esters of cellulose it does have the disadvantage that the alkali must be added very slowly or partial saponification of the ester may take place. Thus, although this method is practical when care is exercised, production may be facilitated by our improvement.

One object of our invention is to provide a process for the preparation of salts of dicarboxylic acid esters of cellulose in which the ester may be subjected to the action of the total amount of reagent initially. Another object of the invention is to provide a process for the preparation of inorganic salts of dicarboxylic acid esters of cellulose which consumes less time than that in which an alkali hydroxide is employed. Other objects will appear herein.

We have found that an inorganic salt of a dicarboxylic acid ester of cellulose may be prepared easily and quickly by treating the ester with an aqueous solution of a weakly basic salt. We have found that many of the carbonates of the alkali metals are especially suitable for use in this connection.

The following examples illustrate processes which embody our invention:

Example I

A solution of 20 lbs. of sodium bicarbonate in 400 lbs. of water was prepared and 8 lbs. of butyl alcohol were added thereto. 100 lbs. of a cellulose acetate phthalate having 35% phthalyl content were stirred into this mixture and the stirring was continued until the ester was all dissolved. Carbon dioxide was given off which tended to cause foaming, however, this was not excessive due to the presence of the butyl alcohol. After the solid had completely dissolved, the solution was filtered and the filtrate was allowed to stand until free from bubbles. The cellulose acetate sodium phthalate formed may be separated from the solution by pouring the mass into an excess of acetone or it may be employed directly for any purpose for which an aqueous solution of this salt is desired. As the acid radical of the sodium bicarbonate is converted to carbon dioxide and passes off as a gas there is no other contaminating material formed in this reaction.

Example II

The same procedure was followed as was employed in Example I except that 12.6 lbs. of sodium carbonate were employed in place of the 20 lbs. of sodium bicarbonate used therein.

Example III

It is highly desirable in the carrying out of the present process that the basic reagent be added in an amount which will just neutralize the free carboxyl present in the dicarboxylic acid ester of cellulose employed. The advantage of this procedure may be seen when it is noted that when both the ester and the bicarbonate are completely consumed in the reaction, the resulting mixture consists only of the salt formed and water, perhaps with a little anti-foaming agent. It was decided to employ 37.4 lbs. of a fully esterified cellulose acetate succinate in which 60% of the total acyl content was succinyl. It was calculated that this ester would require 10 lbs. of sodium bicarbonate to form the sodium salt of the ester. 10 lbs. of sodium bicarbonate were dissolved in 200 lbs. of water containing a little butyl alcohol. The acetate succinate was stirred into the solution until it was completely dissolved. The solution was then filtered and it now constituted an aqueous solution of cellulose acetate sodium succinate which was suitable for use or from which the salt could be separated by precipitation in acetone.

The compounds prepared by the present invention may be represented by the formula

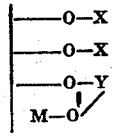

in which represents the $C_6$ portion of a cellulose unit, X may represent either an alkyl, acyl, hydroxyl and/or Y—O—M group, Y represents an aromatic or aliphatic hydrocarbon nucleus such as a benzene ring or an aliphatic straight chain and M represents either $NH_4$, Na, K, Rb, or Cs. The reaction which takes place in a process of preparing cellulose acetate sodium phthalate in accordance with the present invention might be represented by the following equation, in which sodium bicarbonate is employed.

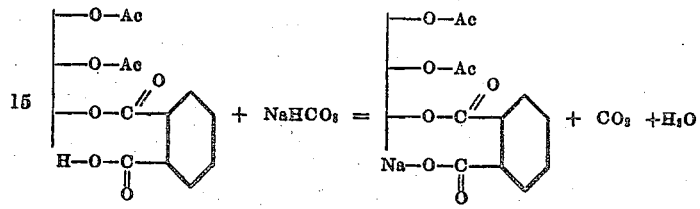

The reaction which takes place in a process of preparing cellulose sodium succinate, using sodium bicarbonate might be represented by the following equation:

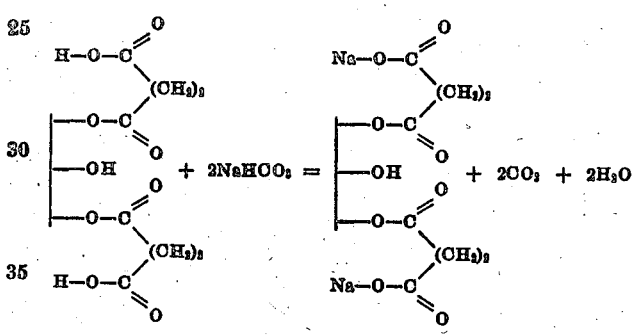

It is to be understood that the above formulae are illustrative and that the content of dicarboxylic acid groups in any cellulose ester cannot be predicated on the proportions of the acyl groups which are shown in these formulae.

Although sodium bicarbonate and sodium carbonate are the preferred salts for use in processes embodying our invention due to their inexpensiveness, suitability and their formation of carbon dioxide and water, any other salt which is mildly basic but which does not have sufficient basicity to remove the acyl groups from the cellulose ester may be employed. Some of the salts which we have found are suitable for use in our invention are mono- and di-sodium phosphates, sodium borate and sodium bisulfite or their equivalent salts of potassium. Due to their availability the sodium or the potassium salts will be usually employed, however, it is to be understood that the corresponding salts of the other alkali metals may also be employed if desired. When a phosphate or a borate is employed, the phosphoric or boric acid formed as a result of the reaction will be present in the aqueous solution and as the separation of the cellulose ester salt and either of those acids becomes a problem, the reason for preferring a salt which forms an acid which breaks up into a gas and water may be readily seen. Although sodium bisulfite answers this description and has been found suitable for processes embodying the present invention, the sulfur dioxide which is given off is not inert in the same sense as $CO_2$ nor is it as insoluble in water as is $CO_2$ so that its presence in the completed reaction mass is to a certain extent undesirable. Salts of alkali metals which are combined with strong acids such as sodium chloride, sodium sulfate etc., will be of little, if any, effect in the present invention due to their substantial neutrality.

The present invention is applicable to reacting upon mixed esters of cellulose which contain a dicarboxylic acid radical and another acyl group or simple esters of cellulose in which the only acyl therein is a particular dicarboxylic acid radical. Obviously a cellulose ester containing two different dicarboxylic acid radicals would also be suitable for use as a starting material for a process embodying the present invention.

The water soluble salts of the dicarboxylic acid esters of cellulose have been found to be valuable, when employed in conjunction with a dye, for the backing of photographic film to form an antihalation coating thereon. Because of its water solubility this colored layer is removed in the developing of the film so that the use of a film having this antihalation coating requires no more than the ordinary processing to convert it into a satisfactory photographic negative. Photographic film containing such an antihalation coating is disclosed and claimed in U. S. Patent No. 1,884,035 of C. J. Malm.

Other uses for these salts such as sizing or adhesive compositions or as a vehicle for carrying dyes or pigments will suggest themselves for use where water soluble cellulose derivatives are desired.

We claim as our invention:

1. The process of preparing an alkali metal salt of a cellulose ester containing a dicarboxylic acid radical having a free carboxyl group which comprises treating that ester with a weakly basic alkali metal salt in an amount approximately molecularly equivalent to the free carboxyl of the ester whereby hydrolysis of the cellulosic compound is avoided.

2. The process of preparing an alkali metal salt of a cellulose ester containing a fatty acid radical and a dicarboxylic acid radical having a free carboxyl group which comprises treating that ester with a weakly basic alkali metal salt in an amount approximately molecularly equivalent to the free carboxyl of the ester whereby hydrolysis of the cellulosic compound is avoided.

3. The process of preparing an alkali metal salt of a cellulose ester containing a dicarboxylic acid radical having a free carboxyl group which comprises treating that ester with an alkali metal salt of carbonic acid in an amount approximately molecularly equivalent to the free carboxyl of the ester whereby hydrolysis of the cellulosic compound is avoided.

4. The process of preparing an alkali metal salt of a cellulose acetate phthalate containing free carboxyl groups which comprises treating that ester with an alkali metal salt of carbonic acid in an amount approximately molecularly equivalent to the free carboxyl of the ester whereby hydrolysis of the cellulosic compound is avoided.

5. The process of preparing an alkali metal salt of a cellulose ester containing a phthalyl radical having a free carboxyl group which comprises treating that ester with a weakly basic alkali metal salt in an amount approximately molecularly equivalent to the free carboxyl of the ester whereby hydrolysis of the cellulosic compound is avoided.

6. The process of preparing an alkali metal salt of a cellulose ester containing a succinyl radical having a free carboxyl group which comprises treating that ester with a weakly basic alkali metal salt in an amount approximately molecularly equivalent to the free carboxyl of the ester whereby hydrolysis of the cellulosic compound is avoided.

CARL J. MALM.
CHARLES R. FORDYCE.